Patented Dec. 13, 1927.

1,652,926

UNITED STATES PATENT OFFICE.

HENRY A. BLOCKER AND MINDON L. MULLIN, OF SHREVEPORT, LOUISIANA.

PRODUCT FOR USE IN UNITING RUBBER SHEETS AND IN REPAIRING RUBBER ARTICLES.

No Drawing. Application filed April 2, 1926. Serial No. 99,424.

Our invention relates to the art of uniting pieces of rubber and of repairing holes, tears and rips in rubber goods, such as tires, tubes, hot water bottles, rubber boots and the like.

One object of our invention is to provide a new and useful composition of matter, hereinafter referred to as a bonding agent for rubber, which, when applied to rubber materials, will render them capable of uniting one with another to form a bond which will be practically impossible to break.

Another object of our invention is to provide a so-called bonding agent which will cause rubber surfaces to unite practically instantaneously and in the absence of heat. A further object is to provide a union between two rubber surfaces which can be made in the cold and which upon subsequent heating will not deteriorate but rather improve.

A further object is to provide new and improved methods of uniting rubber surfaces and of repairing rubber articles. Other objects of our invention will be apparent from a consideration of the specification and claims.

Rubber cements have been long known in the art. These consist in rubber solutions which may be applied to the goods, and by simply a binding action cause the surfaces to adhere. Since these unions are merely mechanically made by the cement, they separate in use and are never so completely joined that they cannot be pulled apart. Furthermore, heat tends to cause separation which results in the loosening of the patch even under the heat generated by the tire in use.

We have invented a new composition of matter which for convenience we term a "bonding agent". This compound, when used in the manner hereinafter fully described, will form a union between two rubber surfaces which cannot be broken even under severe tests.

Heat has no deleterious effect upon the union, but on the other hand, if there is any action at all, it is to join the surfaces even more securely together. The action of the composition is not thoroughly understood, but it is thought that it acts upon the rubber causing it to assume a condition which will allow the surfaces to join in such a manner that they become one piece, that is, that they become part and parcel of each other. This would account for the fact that they cannot be separated after treatment.

Our bonding agent may be prepared by dissolving a relatively small amount of rubber in suitable organic solvents such as ether, benzol and naphtha. We have found that a very satisfactory bonding agent may be prepared by treating rubber with naphtha or gasoline to form the so-called "liquid gum" of commerce and then adding to this solution the other solvents such as the ether or benzol. The 5% solution of rubber in naphtha treated with approximately equal parts by volume of ether and benzol will give a satisfactory bonding agent. A formula which we have used sucessfully consists of a 5% solution of rubber in naphtha, mixed with 50% by volume of ether and 45% by volume of benzol.

The addition of small amounts of other organic rubber solvents markedly increase the effectiveness of the solution for certain purposes, particularly for the repairing of tire inner tubes. Chloroform added in percentages as low as 3% by volume materially aids in forming the bond between the rubber article and the patch. This solvent may be present in much greater percentages but the exact composition to be employed varies with the particular grade of rubber to be treated. A typical formula in which the additional solvent is used is either 50%, benzol 42%, chloroform 3%, and 5% of a solution containing 5% of rubber and 95% of naphtha (volume percentages throughout).

When two pieces of rubber are to be joined, the surfaces are thoroughly scraped and buffed until the whole area to be joined is roughened. A small quantity of the bonding agent of the composition above described is worked into the pores of the surfaces for one minute, the excess solvent is then removed and the pieces brought together under a slight pressure. After a moment, the pieces will be found to have joined and in a very short time the union will become so secure that the pieces cannot be separated. No heat is necessary to accomplish this but heat will not act deleteriously and may be used if desired.

We have described the process to be used when two pieces are to be joined. The method of repairing holes or punctures in inner tubes and the like is analogous. An area about one inch around the hole is thoroughly buffed and scraped until the surface is roughened. A small quantity of the bonding agent is worked into the pores for about one minute after which the excess is removed. A piece of the usual semi-cured patching rubber having one side protected by cloth or other suitable material is cut into the same size as the treated portion and the clean side after the protective covering is removed is placed upon the tube. A slight pressure is exerted upon the patch whereupon the patch will permanently adhere to the tube. The action is so rapid that the tube may be inflated to its customary pressure at once. The patch will withstand the greatest possible degree of road heat and will not become loose under any treatment. In a similar manner, hot water bottles, rubber boots, rubbers and the like may be repaired. For these purposes, we have found it convenient to use semi-cured rubber as the patching material.

While we have described the principal chemicals as ether and benzol, their equivalents might be used, such as the higher aliphatic ethers and the higher homologues of benzol (toluene, etc.). In place of the rubber, other substances of the general nature might be used, for example, gutta percha or balata. Obviously also, a product containing the essential ingredients of the bonding agent may be obtained by other processes and the invention is not to be limited to any particular process of manufacture nor is there any limitation in the proportions of the ingredients in the product since these may be largely varied to suit the particular use for which the bonding agent is intended nor is there any limitation in the steps of the process of repairing the rubber goods since such variations are well within the skill of one familiar with the art.

We claim:

1. A composition of matter to be used in the uniting of rubber sheets and in the repairing of rubber goods which comprises approximately 5% of a rubber solution containing 5% of rubber and 95% of naphtha dissolved in approximately equal parts of ether and benzol.

2. A composition of matter to be used in the uniting of rubber sheets and in the repairing of rubber goods which comprises approximately 5% of a rubber solution containing 5% of rubber and 95% of naphtha dissolved in approximately equal parts of ether and benzol and 3% chloroform.

HENRY A. BLOCKER.
MINDON L. MULLIN.